United States Patent [19]

Blau

[11] 4,249,817
[45] Feb. 10, 1981

[54] ADJUSTABLE HEAD FOR TRIPODS

[76] Inventor: Robert E. Blau, 791 Rosewood Ave., Winnetka, Ill. 60093

[21] Appl. No.: 41,018

[22] Filed: May 21, 1979

[51] Int. Cl.³ .................... G03B 17/00; F16M 11/12
[52] U.S. Cl. ................................... 354/293; 248/183
[58] Field of Search ............... 354/290, 295, 293, 81; 248/179, 183; 352/243

[56] References Cited

U.S. PATENT DOCUMENTS

| | | | |
|---|---|---|---|
| 2,469,063 | 5/1949 | Bliss | 248/183 |
| 2,618,452 | 11/1952 | Imhof | 248/183 X |
| 3,128,982 | 4/1964 | Christopher | 248/183 |

Primary Examiner—Donald A. Griffin

[57] ABSTRACT

Three separately, manually operable mechanisms quickly and easily permit the independent adjustability of a camera around three perpendicular axes of rotation. The novel assembly consists of four interconnected elements consisting of an adapter, a head member, a body member, and a base member. The adapter is removably attachable to a camera and the base member is movably attachable to a main camera support. The connecting mechanism between the adapter and the head member allows for camera positioning about the vertical axis, the connecting mechanism between the head member and body member allows for camera positioning in a side-to-side direction about a first horizontal axis, and the connecting mechanism between the bodymember and base member allows for camera positioning in a fore and aft direction about a second horizontal axis perpendicular to the first horizontal axis.

5 Claims, 7 Drawing Figures

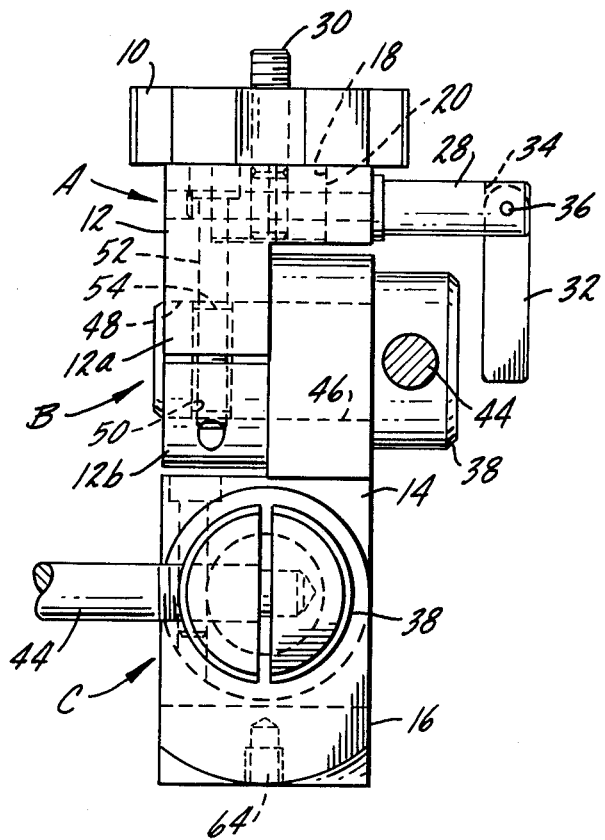
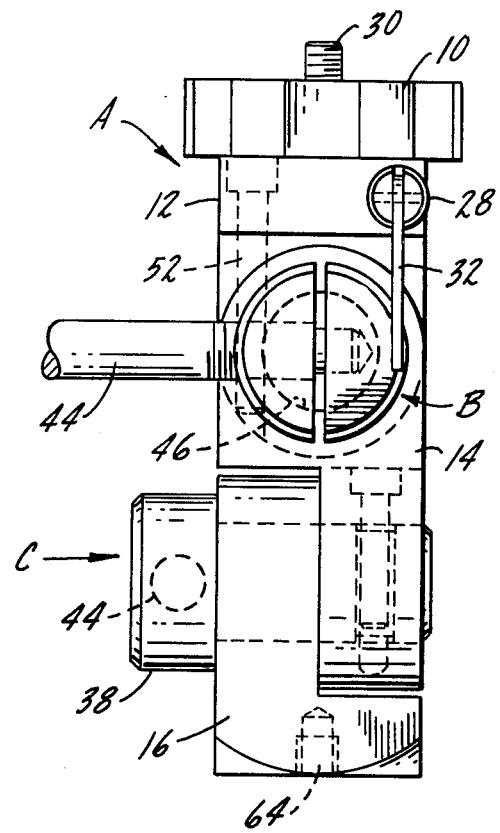
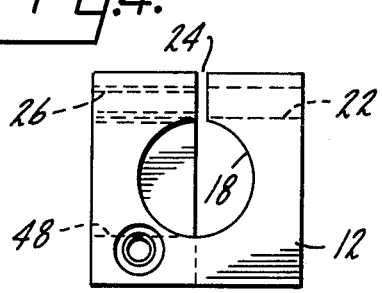
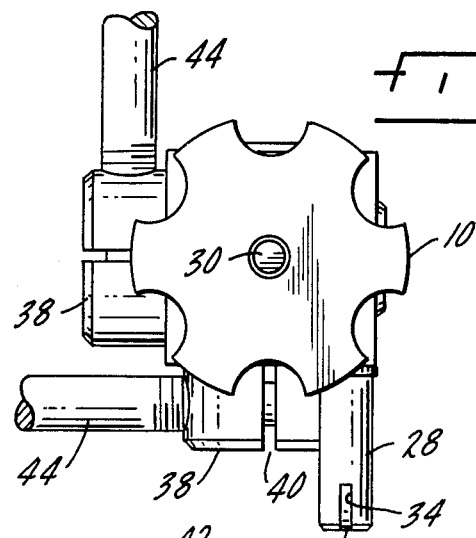
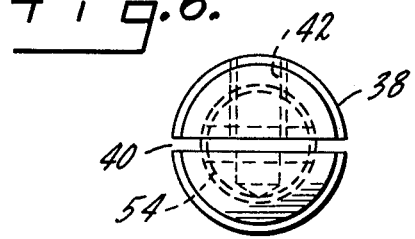
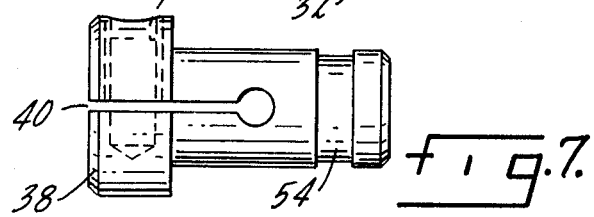

ADJUSTABLE HEAD FOR TRIPODS

BACKGROUND OF THE INVENTION

It is extremely important in still photography to be able to mount a camera in a variety of positions in a quick and efficient manner and the number of positions in which the camera can be adjusted relative to the tripod yet remain fixed thereto when placed in any given position should be infinite.

Prior to the present invention, there has not been a device which can as easily, quickly and efficiently adjust and maintain the position of the camera about three perpendicular axes with the facility to release and clamp the position of the camera about one axis of rotation independently of the two other perpendicular axes of rotation. In addition, right or left hand operation is not possible with existing units.

SUMMARY OF THE INVENTION

In accordance with the present invention, there is provided a universal camera mount which permits the photographer to adjust the camera in an infinite number of positions. Essentially, the novel mounting assembly is capable of allowing the operator to position a camera about all three axes and to readily clamp and release a camera in position. The arrangement permits independent fore and aft positioning, side-to-side positioning, and 360° rotation of the camera relative to a tripod, or like support, or any combination thereof.

BRIEF DESCRIPTION OF THE DRAWINGS

The various features of the invention will be seen from the following drawings, in which:

FIG. 2 is a side elevation view of the adjustable camera mount;

FIG. 3 is a view taken looking from the right-hand side of FIG. 1;

FIG. 4 is a plan view of the head member;

FIG. 5 is a plan view of the assembly shown in FIG. 2;

FIG. 6 is a side view of the shaft shown in FIG. 7; and

FIG. 7 is a view of the shaft used to interconnect both the head member to the body member and the body member to the base member.

DESCRIPTION OF THE PREFERRED EMBODIMENT

Figure 1:
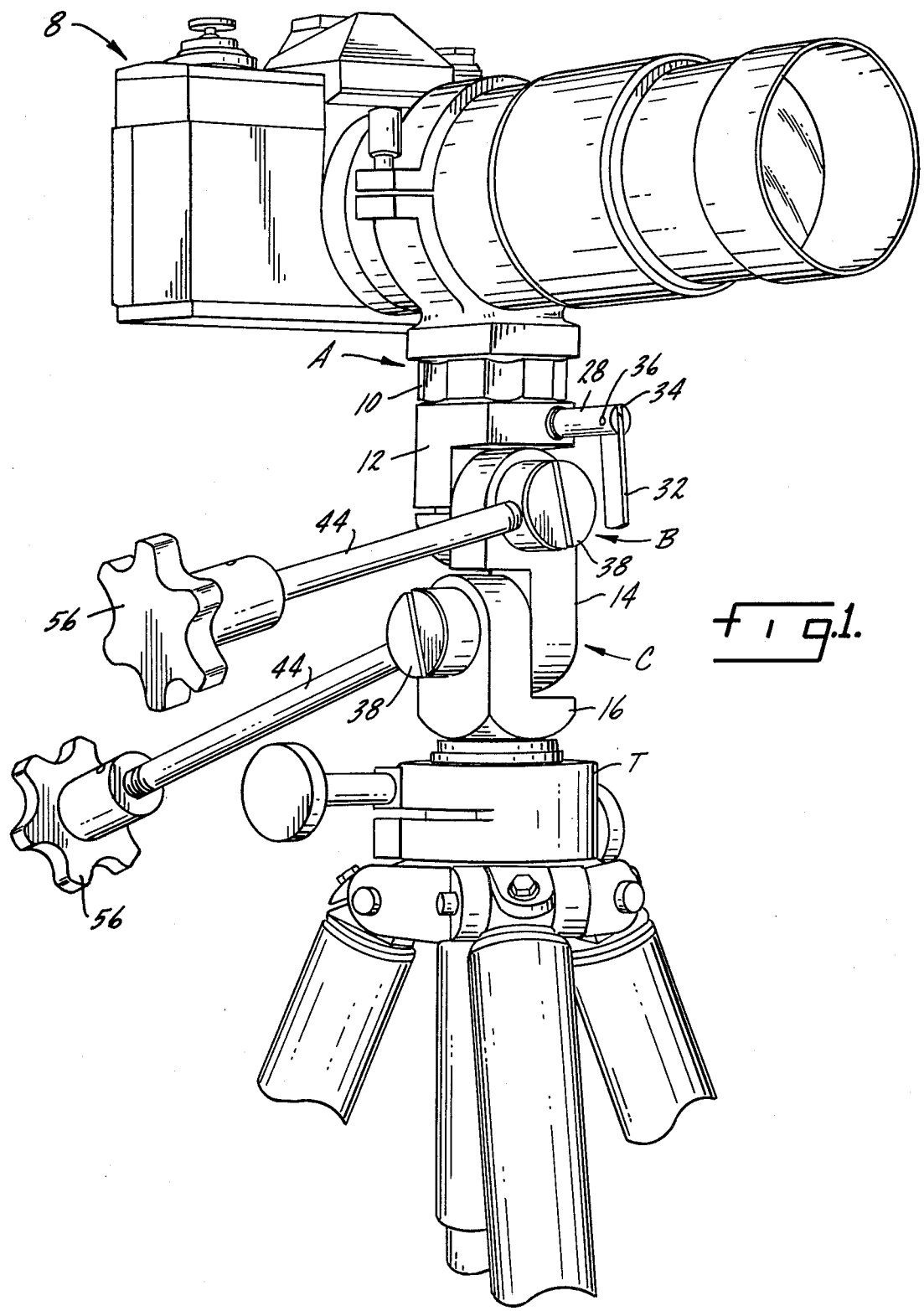
FIG. 1 is a perspective view showing the adjustable camera mount located between a camera and a tripod.

Referring to the drawings, the novel adjustable camera mount consists of basically four elements: an adapter 10, a head member 12, a body member 14, and a base member 16. The elements are clamped together by means of simple and efficiently operated relesable clamping assemblies.

The first releasable clamping mechanism A to be considered is that which is provided for clamping the adapter 10 to which the camera 8 is attached to the head member 12. In the illustrated embodiment, the adapter 10 includes a threaded stud 30 protruding from adapter 10 that is easily received by a threaded bore which is normally located at the center of the base of most cameras. When this clamping mechanism is loose, the adapter and associated camera can be rotated to any desired position or removed from the camera mount. The clamping mechanism essentially consists of the adjustable head member 12 and its associated shaft 20 that protrudes from the adapter 10. The shaft 20 fits into a bore 18 in the head member and the camera is free to rotate, depending on the fit of shaft 20 relative to the bore 18. The head member is split, as shown at 24, and also includes a bore 22 located tangential to the bore 18 which has inner threads 26 only in its left-hand section. Thus, when bore 22 receives threaded clamp screw 28, the space 24 can be decreased by tightening the clamp screw 28 which serves to lessen the circumference of first bore 18 to tighten the head member 12 about the shaft 20 of adapter 10 to prevent rotational movement of the adapter relative to head member 12. Thus, when the camera operator desires to adjust the rotational movement of the camera about the vertical axis, he merely loosens clamp screw 28, which allows the circumference of bore 18 to increase and when the desired position is achieved, the operator merely tightens clamp screw 28 and then the adapter and likewise the camera are stayed from further rotational movement. The camera can be positioned and rotated about a 360° angle.

A wing flap 32 is pivotally attached to the end of the clamp screw 28 and acts to permit ready readjustment of the clamp screw 28. The wing flap 32 is received in the channel 34 of clamp screw 28 and pivots about pin 36. The protruding end of clamp screw 28 is purposefully short so as not to interfere with any lenses or lense adjustments of the camera.

The second clamping mechanism B for permitting quick and efficient movement of the head member relative to the body member for adjustable side-to-side positioning and the third clamping mechanism C for permitting adjustable fore and aft positioning of the camera relative to the tripod are substantially identical.

Each of these clamping mechanisms includes a shaft 38 that has a diametrical channel 40 which divides the shaft into two sections along part of the length of the shaft and a diametrically extending bore 42 at the channeled end of the shaft 38 which is normal to the channel 40 (see FIGS. 6 and 7). The bore 42 is threaded and extends completely through the top section of the shaft 38, but is unthreaded at the bottom section of the shaft and extends only partway therethrough. The bore 42 receives a set screw 44 that is threaded at its middle region and unthreaded at its tip, so that when it is received by bore 42 and rotated therein, the unthreaded tip of the set screw will be fully received by the unthreaded bottom section of diametrical bore 42. When the set screw is in place, further rotation thereof will cause the channel 40 to widen, thereby increasing the effective circumference of shaft 38 along its channeled portion. When this occurs, the shaft 38 is locked in position and the members that it interconnects are immovably positioned. Conversely, when the set screw 44 is partially withdrawn, the channel narrows and the shaft is free to move within the bore in which it is located.

Referring now specifically to clamping mechanism B for interconnecting the head member 12 to the body member 14, it is seen that the shaft 38 of this assemblage is received by bore 46 of body member 14 and by aligned bore 48 of head member 12. Bore 46 has a larger diameter than bore 48 and thus the shaft 38 in its unexpanded position is freely inserted through bore 46, but is slidingly fitted into bore 48. The head member 12 is secured to the shaft 38 by a threaded set screw 52 that extends through a threaded bore 50 and head member 12 disposed tangential to bore 42. As best shown in FIGS. 2 and 3, the tightening of set screw 52 clamps together the split sections 12a and 12b of head member 12 to prevent rotational and longitudinal movement of shaft 38 relative to head member 12. The set screw 52 extends tangent to the shaft 38 in the annular channel 54 formed by the smaller diameter portion of the shaft 38 and in such position prevents longitudinal movement of the shaft 38 relative to the head member 12. By loosening set screw 52, shaft 38 can be rotated to any convenient position for operation by either hand. Tightening set screw 52 locks shaft 38 in the position chosen by the user. The set screw 52 is also countersunk within the top surface of head member 12 so as not to interfere with the interfacing of adapter 10 with head member 12.

When the shaft 38 extends loosely through body member bore 46 and is clamped into position in head member bore 48 by set screw 52, the shaft 38, and thus head member 12, adapter 10, and the camera are free to pivot from side to side relative to the body member 14. When the operator obtains the desired positioning of the camera within this plane of movement, he merely tightens the screw 44 to expand shaft 38 to immovably position the head member relative to the body member.

For ease of operation and adjustment, the threaded set screw 44 has a knob 56 attached to the end not received by shaft 38.

The third releasable clamping mechanism C is identical to clamping mechanism B and is interposed between body member 14 and base member 16 to control the movement between the body member 14 and base member 16 in the fore and aft directions.

Thus, it can be seen that the camera mount can be readily and efficiently adjusted to any of an infinite number of positions about the three normal axes by quickly and easily engaging and disengaging the various clamping mechanisms. A photographer having the ability to accomplish these infinite adjustments will be able to take pictures in whatever positions desired, which currently is more difficult with commercially available equipment.

The base member 16 includes a threaded bore 64 which is adapted to receive a threaded stud on a tripod T, or the like.

Although an illustrative embodiment has been shown and described, it is understood that various modifications and substitutions may be made without departing from the novel spirit and scope of the present invention which is to be limited only by the scope of the following claims.

What is claimed is:

1. A camera mount for adjustably positioning a camera relative to a main camera support comprising: a plurality of means providing for adjustable positioning of the camera about three perpendicular axes and means for releasably clamping the plurality of adjustment means to maintain the position of the camera relative to each axes of the axes when independently located relative thereto, wherein at least one of said adjustment means includes a block defining a bore, a shaft, the shaft having a channel which divides the shaft into at least two sections along less than the entire length of the shaft which is received by said bore, means for adjusting the effective circumference of said shaft between a first dimension wherein said shaft is prevented from rotational movement within said bore and a second dimension wherein the shaft is free to rotate within said bore at the channeled end of the shaft and means for removably attaching the camera mount to a camera and its main support.

2. The camera mount of claim 1 wherein the channel defined by said shaft is generally diametrical.

3. The camera mount of claim 1 wherein the means for adjusting the effective circumference of the shaft comprises:

the shaft having a bore whose axis is generally normal to the axis of the shaft, said bore having a threaded portion which extends completely through one section of the shaft; and a threaded set screw received by said threaded bore which increases and decreases the effective diameter of the channeled end of the shaft when the set screw is rotated in one direction and the other direction, respectively.

4. An adjustable camera mount comprising: an adapter removably attached to a camera; a head member rotatably mounted relative to said adapted to allow the adapter to rotate about a vertical axis relative to said head member; a first releasable clamping means which controls the relative movement of said adapter and head member; a body member rotatably mounted relative to said head member so as to allow the head member to axially pivot side to side about a first horizontal axis; a second releasable clamping means which controls the relative movement of said head member and body member; a base member rotatably mounted relative to said body member so as to allow the body member to axially pivot fore and aft about a second horizontal axis generally normal to the first horizontal axis and which is removably attachable to a tripod or the like; and a third releasable clamping means, which controls the relative movement of said body member and base member, wherein at least one of the second and third releasable clamping means comprises: a shaft extending through aligned bores in the members it is to movably connect, the shaft defines a diametrical channel which divides the shaft into two sections along part of the length of shaft; said shaft defining a bore at the channeled end of the shaft which is normal to the channel, which bore has a threaded portion that extends completely through one section of the shaft and has an unthreaded position that extends only partially through the other section of the shaft; a set screw which is threaded at its middle region but unthreaded at its tip which is received by the threaded bore and which reduces the circumference of the shaft at the channeled end when the set screw is rotated in one direction but which increases the circumference of the shaft when the set screw is rotated in the other direction so that the members receiving the shaft are firmly retained against relative rotational movement with respect to each other when the circumference of said shaft is increased but which members are free to rotate relative to each other when the circumference of the shaft is decreased; and means to secure the non-channel end of the shaft within one of said members to prevent relative rotational movement between the shaft and one of said members.

5. The adjustable camera mount of claim 4 wherein the threaded set screw has a knob attached to the end of the set screw not received by said shaft, so as to enable an operator to more easily rotate the set screw.

* * * * *